United States Patent [19]
Cushman et al.

[11] Patent Number: 5,505,082
[45] Date of Patent: Apr. 9, 1996

[54] RAINFALL RATE GAUGE

[76] Inventors: Robert B. Cushman, Box 435, Cedar Crest, N.M. 87008; Gary Birch, 7077 E. Shorecrest Dr., Anaheim Hills, Calif. 92807

[21] Appl. No.: 382,401

[22] Filed: Feb. 1, 1995

[51] Int. Cl.⁶ .................................................. G01W 1/14
[52] U.S. Cl. ................................. 73/170.21; 73/170.23
[58] Field of Search ........................... 73/170.17, 170.21, 73/170.22, 170.23

[56] References Cited

U.S. PATENT DOCUMENTS

| | | | |
|---|---|---|---|
| 1,118,259 | 11/1914 | Beard | 73/170.17 |
| 3,127,769 | 4/1964 | Stucky et al. | 73/171 |
| 3,229,519 | 1/1966 | Nilsson | 73/170.21 |
| 3,978,723 | 9/1976 | Davis | 73/171 |
| 4,287,762 | 9/1981 | Baer | 73/170.17 |
| 4,644,786 | 2/1987 | Jacobsen et al. | 177/94 |
| 4,827,766 | 5/1989 | Nelson | 73/170.21 |
| 5,125,268 | 6/1992 | Caron | 73/170.17 |
| 5,408,892 | 4/1995 | Kawanami et al. | 73/170.17 |

FOREIGN PATENT DOCUMENTS

| | | | |
|---|---|---|---|
| 1326088A | 3/1963 | France | 73/170.17 |
| 2247848 | 4/1974 | Germany | 73/170.22 |
| 4104451A | 8/1992 | Germany | 73/170.21 |
| 354156588A | 12/1979 | Japan | 73/170.17 |
| 360143799A | 7/1985 | Japan | 73/170.17 |
| 171136A | 5/1965 | U.S.S.R. | 73/170.17 |

*Primary Examiner*—Richard Chilcot
*Assistant Examiner*—George M. Dombroske

[57] ABSTRACT

A rainfall rate gauge contains a turbine which turns on a horizontal axis and floats in a chamber about half full of water. Turbine motion is measured and electronically recorded by an optical sensor. The blades of the turbine have a reverse rake so that the a portion of the water captured in each bucket is carried above the water surface before being released when the blade tip breaks the water surface. This arrangement prevents unrestrained free wheeling of the turbine, and results in more precise measurement, particularly at very low rainfall rates.

8 Claims, 4 Drawing Sheets

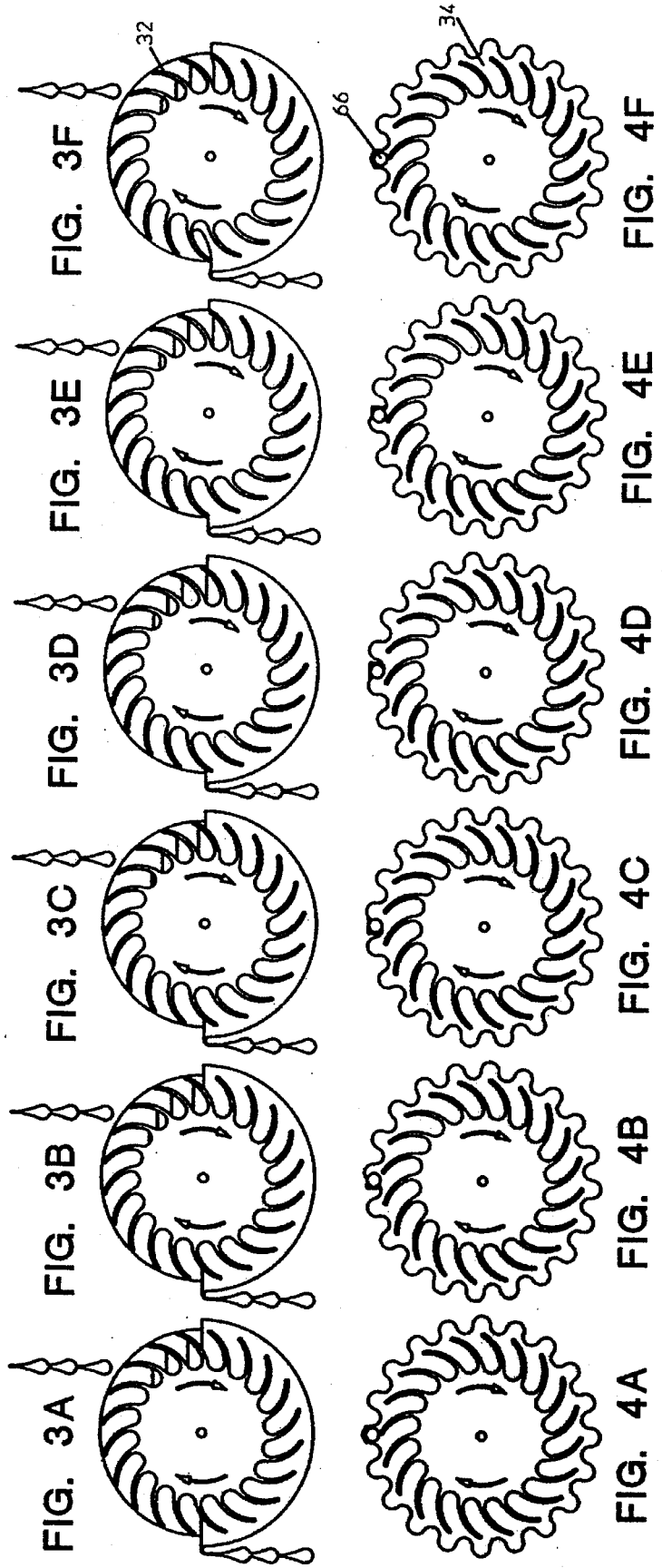

5,505,082

RAINFALL RATE GAUGE

BACKGROUND OF THE INVENTION

This invention relates generally to meteorological instruments, and more particularly to a rainfall rate gauge or meter capable of measuring very light to very heavy rainfalls.

Meteorologists, forest rangers and others require accurate rainfall meters, which will work unattended, for the most part, and will store information about rainfall history. A number of devices suitable for this purpose are well known. One type of rainfall gauge has one or more buckets which fill with water as rain falls on a collection funnel above the bucket. See U.S. Pat. No. 4,644,786, for example. When the bucket has filled to a certain point, it becomes unstable and tips sideways, discharging the contents. A mechanical or electrical device may note this event in a recorder of some sort.

Conventional pivoting bucket-type rain gauges are not well suited for measuring very low rainfall rates. Once the time required to fill the bucket exceeds the sampling interval, the measurement loses some of its meaning.

In arid areas, even slight rain may strongly influence the environment. The combustibility of ground materials, for example, can be greatly affected by light rain. We thus consider it important to improve on the accuracy and sensitivity of bucket-type rainfall meters.

Some prior inventors have proposed replacing the pivoting rain buckets with a turbine wheel, so that the weight of the water in the recesses on one side of the turbine causes the wheel to rotate. See U.S. Pat. Nos. 3,127,769 and 3,978,723 for examples. Friction is a critical variable for such devices, since they are not positively displaced. A lower friction turbine turns more rapidly than does one with higher friction, all other factors being equal, since the turbine buckets need not be filled any particular amount in order to rotate the turbine. For very small gauges, surface tension effects can also provide substantial uncertainty.

SUMMARY OF THE INVENTION

An object of the invention is improve the accuracy of rainfall measurement, particularly at very low rainfall rates.

A second object is to minimize friction effects in a rainfall meter.

Another object of the invention is to provide a gauge which will work reliably, when left unattended in a remote location, for a year or more.

A further object of the invention is to improve the resistance of a rain gauge to deliberate or accidental damage.

These and other objects are attained by a rainfall rate gauge including a housing defining a flow path and containing a freely rotatable turbine wheel, and supporting an optical sensor for measuring wheel rotation. Filters above and below the turbine keep particulate matter from fouling the moving parts, and the passage above and below the turbine may have an "S" shape to prevent passersby from disabling the device by inserting a stick or the like. To provide a consistent degree of damping, the turbine chamber is kept partially full of water at all times by a dam in the outlet path. The dam may be replaceable, so that any one of a set of dams of different heights may be installed.

BRIEF DESCRIPTION OF THE DRAWINGS

In the accompanying drawings,

FIGS. 3A–3F illustrate the turbine of the gauge, the turbine having advanced about 3° in each step of the sequence;

FIGS. 4A–4F show the rotary mask, affixed to the turbine, in its corresponding positions.

DESCRIPTION OF THE PREFERRED EMBODIMENT

Figure 1:
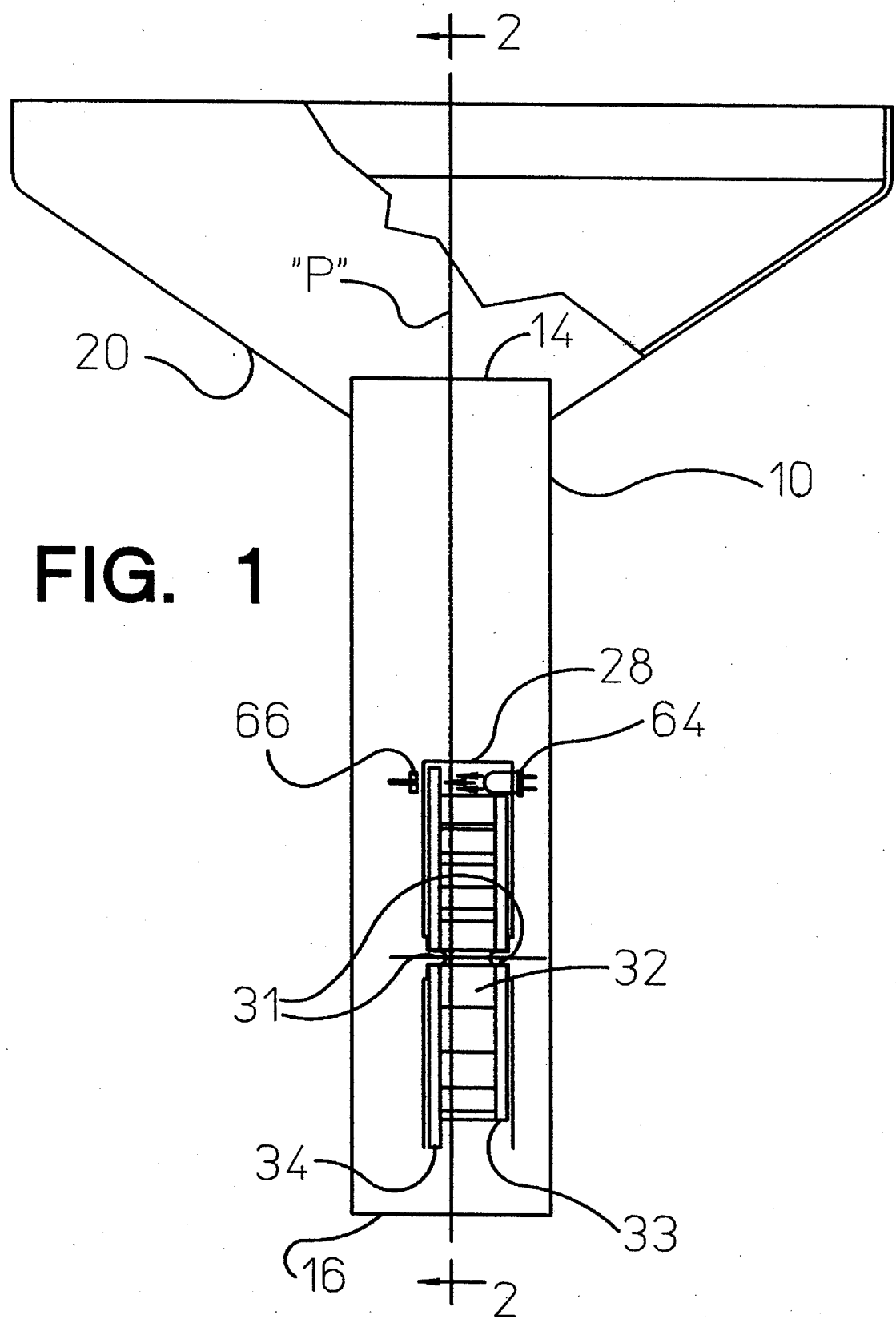
FIG. 1 is a side elevation of a rainfall gauge embodying the invention.

A rainfall rate gauge embodying the invention includes a housing 10 defining an internal flow path 12 extending from an upper surface 14 of the housing to a lower surface 16 thereof. The inlet opening 18 at the top of the flow path is connected to the bottom of a standard rainfall-collecting funnel 20 having a horizontal cross-sectional area of fifty square inches. Immediately below the inlet opening is an upper filter chamber 22, normally filled with a polyester foam filter 24 which intercepts foreign matter before it reaches the moving parts of the device. The flow channel then angles downwardly at throat 26 from the upper filter chamber to a generally cylindrical turbine chamber 28 containing a like-diameter molded plastic acetal (Delrin) or high density polyethylene turbine wheel 30. The wheel is supported on a pair of ruby bearings 31 ("jewels") so that it can rotate freely.

The blades 32 define a series of buckets, each having, preferably, a volume of about 0.05 cubic inch. With a fifty square inch funnel, each bucket is filled by one thousandth of an inch of rainfall. The blades have a reverse rake (that is, their tips point against the direction of rotation), so that they trap water in the buckets adjacent the outlet, as discussed below.

The buckets are bounded by circular rims 33,34 at either end, one of which (34) has an enlarged scalloped periphery which acts as an optical shutter as its protuberances cross the optical path described below.

The outlet channel, below the chamber, narrows downward to a lower filter chamber 36, also containing a foam filter 38 to keep foreign matter out. Above the outlet filter chamber is a serpentine trap 40, formed by a dam 42 made of plastic or metal. The dam maintains a desired water level "L" in the turbine chamber, to provide predictable damping. Preferably, dams of a number of different sizes are provided, so that a person assembling the gauge may vary the water level at, for example 9° increments.

The housing is preferably molded from a hydrophobic plastic material such as high density polyethylene in two halves 42,44 symmetrical about a vertical center plane "P". Opposing recesses 46 are formed in the inner faces of the halves to receive the enlarged bottom end 48 of the dam.

Rainfall gauges are sometimes subjected to tampering or vandalism. A curious passerby might insert a stick or other prod into the outlet or inlet of the device to learn about its workings. Any prod successfully inserted in contact with the delicate turbine would be bound to ruin the device. The outlet is more accessible than the inlet, so an added function of the dam is to interrupt the line of sight and thereby frustrate attempts to disturb the workings by prodding.

More ingenious vandals may attempt to disassemble the device—something they could easily do, if the halves of the housing were merely screwed together. Disassembly could be prevented by gluing or riveting the halves together; however, this would prevent authorized servicing or modification of the gauge. We prefer, therefore, to clamp or join the halves of the housing together with one or more tamper-resistant fasteners (not shown).

Figure 2:
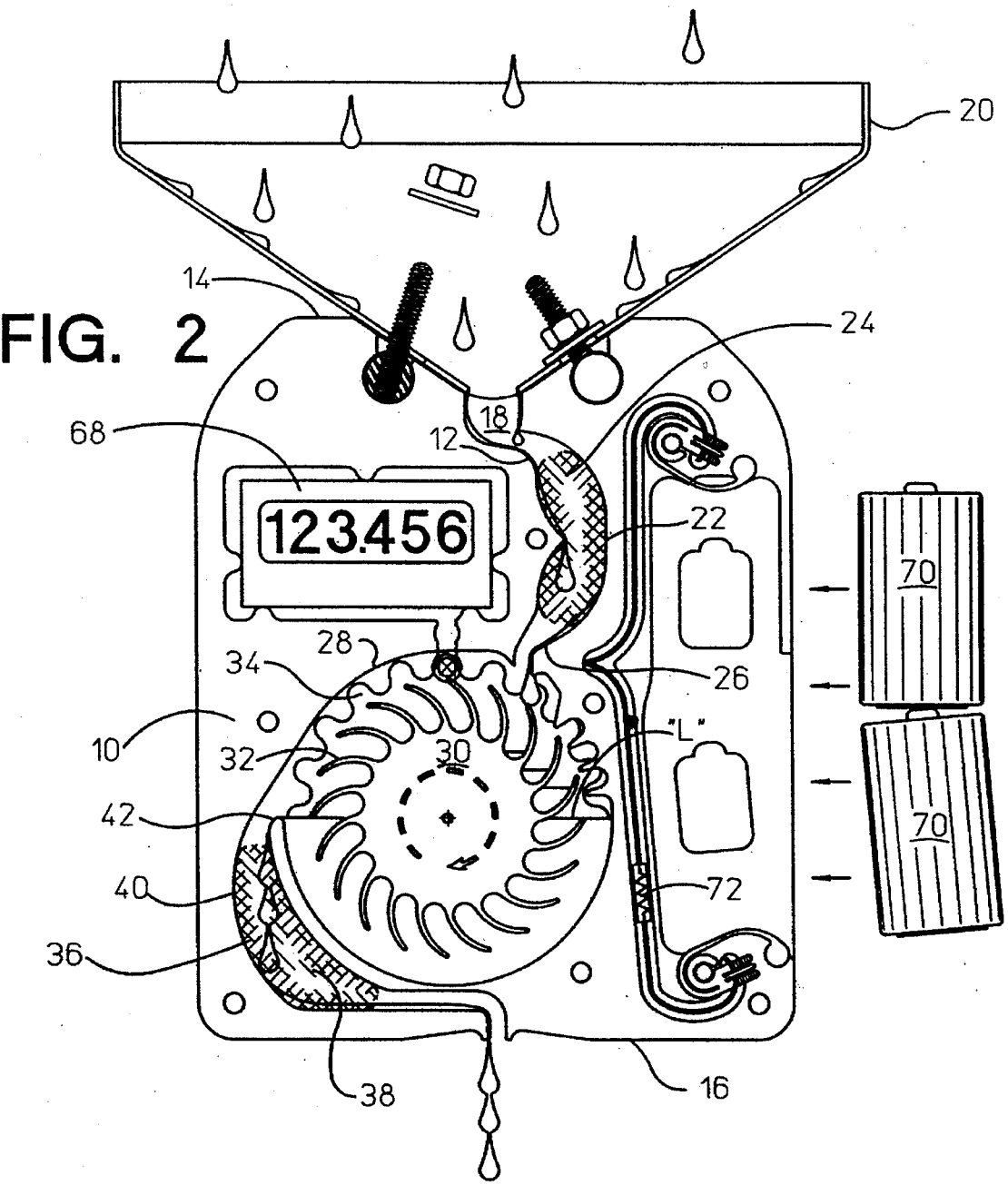
FIG. 2 is a sectional view on the vertical plane 2—2 in FIG. 1.
Figure 5:
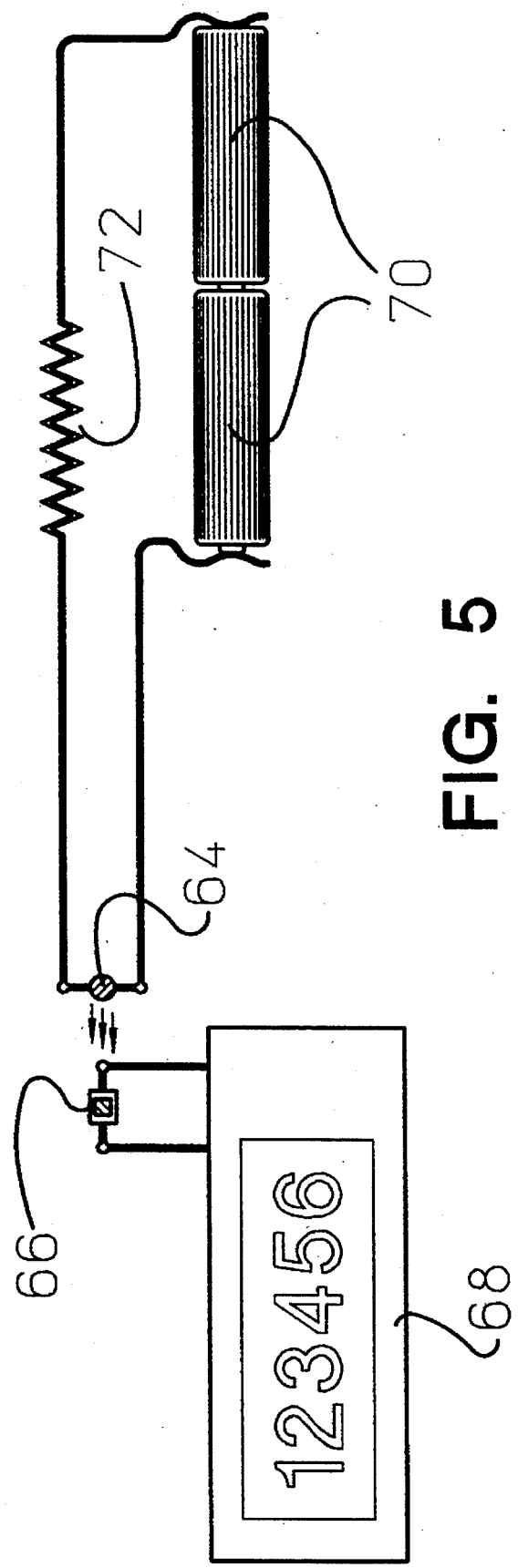
FIG. 5 is a circuit diagram of the invention.

Referring to FIG. 2, one can see the profile of the turbine wheel, and the disposition of sensors for detecting wheel movement. As the turbine rotates, the protuberances on its rotary shutter 34 cross the optical path (represented by a broken line) between an LED diode light source 64 and a photosensor 66. The light path is thus periodically interrupted, as illustrated in the sequence of FIGS. 4A–4F. The sensor is connected to a simple sold-state counter 68 which stores in its memory data representing optical interruptions counted per unit time. The counter and the LED are powered by a pair of "C" or "D" cell batteries 70 also safely contained within the housing. Details of the battery contacts may be seen in FIG. 2. One or more resistors 72 in the current path limits current flow, to preserve the batteries, so that the device can operate unattended for a long time, such as a year. An electrical connector (not shown) on the outside of the housing enables a person occasionally to download the contents of the chip's memory to a portable computer (not shown), for eventual uploading to a fixed personal computer or mainframe.

FIGS. 3A–3F depict a sequence in which the turbine has moved a few degrees clockwise in each successive illustration. As mentioned, the housing around the turbine is always at least half full of water. In FIGS. 3A and 3B, water from the rain collector has begun to fill the turbine buckets, causing an imbalance resulting in a clockwise torque which causes the turbine to move. The greater the rainfall rate, the faster the turbine turns, but its speed is retarded, very predictably, by periodic emptying of each filled bucket as it breaks the water surface and allows air to replace the air in the bucket.

In FIG. 3C, one can see that the bucket nearest the outlet contains some water above the free surface outside the bucket. Because the tip of the bucket's leading blade has not yet broken the surface, air cannot enter. This situation persists through FIGS. 3D and 3E. In the latter figure, the tip is even with the free surface. Finally, in FIG. 3F, air enters, suddenly releasing the contents of the bucket, and sharply increasing the clockwise torque. It may be observed that once the rain stops, the turbine will stop turning as soon as the weight of water captive above the free surface in the downstream bucket equals that in the upstream buckets above the free surface.

We have observed that, once the meter is calibrated for accuracy at a medium flow rate (about 120 cc per minute), there are some measurement errors, on the order of 5%, at extremely high (250 cc/min) and extremely low (5 cc/min) flow rates. But, as the data is stored electronically, a correction curve can easily be applied.

Minimizing static friction is important to achieving accurate measurement at the lower flow rates. We do so by using low-friction bearings on which the turbine turns, and by choosing the turbine material so that the turbine is sufficiently buoyant to float in the water at the height illustrated, about half out of the water, so that the weight of the turbine is borne primarily by the water, rather than by the bearings. A specific density of about 0.5 produces this result when the bearings are at the water surface. In any event, the specific density should be substantially below 1.0.

Since the invention is subject to variations, it is intended that the foregoing description and the accompanying drawings shall be interpreted as illustrative of only one form of the invention, whose scope is to be measured by the following claims.

We claim:

1. A rainfall rate gauge comprising a housing defining an internal chamber having an inlet at its upper end for admitting rain water and a lateral outlet, said chamber having a lower portion below the outlet for containing a reservoir of water, a turbine confined within the chamber for rotation on a horizontal axis near the water surface, so that the turbine is partially submerged, said turbine comprising a pair of end plates and a plurality of blades extending between the end plates, thus defining a like plurality of buckets for receiving water from said inlet, so as to cause the turbine to turn as the buckets on one side of the turbine are filled by the rainwater, each of the blades having a reverse rake to capture water in the bucket as each submerged bucket approaches the water surface, whereby a portion of the water in the bucket is carried above the water surface, thereby acting as a counterweight for water in buckets receiving water from the inlet, before being released by air entry when the blade breaks the water surface, a transducer for producing signals representative of rotation of the turbine, and means for processing said signals.

2. The invention of claim 1, wherein the turbine is made of a material having a specific density of about 0.5, and the said horizontal axis is at about the height of the water surface, so that the weight of the turbine is borne primarily by the water, rather than by the bearings.

3. The invention of claim 1, wherein the outlet comprises a dam selected by a set of dams of variable heights, whereby the water level in the chamber can be altered.

4. The invention of claim 1, wherein the outlet has a serpentine shape to prevent unauthorized prodding of the turbine.

5. The invention of claim 1, wherein the outlet has a filter to prevent animals an other foreign objects from entering the chamber.

6. The invention of claim 1, wherein the inlet has a filter to prevent foreign objects from entering the chamber.

7. The invention of claim 1, wherein the turbine has a scalloped rim comprising a series of protuberances, and the transducer comprises a light source and a light sensor arranged on a light path which is interrupted as the protuberances pass through it.

8. The invention of claim 7, wherein the processing means comprises means for determining the number of interruptions per unit time, and for periodically recording said number.

\* \* \* \* \*